(12) United States Patent
Laaksonen

(10) Patent No.: US 11,074,036 B2
(45) Date of Patent: Jul. 27, 2021

(54) METADATA-FREE AUDIO-OBJECT INTERACTIONS

(71) Applicant: Nokia Technologies Oy, Espoo (FI)

(72) Inventor: Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 15/587,582

(22) Filed: May 5, 2017

(65) Prior Publication Data

US 2018/0321906 A1 Nov. 8, 2018

(51) Int. Cl.
*G06F 3/16* (2006.01)
*G06F 3/01* (2006.01)

(52) U.S. Cl.
CPC .............. *G06F 3/167* (2013.01); *G06F 3/017* (2013.01); *G06F 3/165* (2013.01)

(58) Field of Classification Search
CPC .......... G06F 3/167; G06F 3/017; G06F 3/165; G06F 3/011
USPC ........................................................ 715/716
See application file for complete search history.

(56) References Cited

U.S. PATENT DOCUMENTS

| | | | |
|---|---|---|---|
| 5,450,494 A | 9/1995 | Okubo | 348/E5.122 |
| 5,633,993 A | 5/1997 | Redmann et al. | |
| 5,754,939 A * | 5/1998 | Herz | G06Q 20/383 348/E7.056 |
| 6,151,020 A * | 11/2000 | Palmer | G06F 3/033 715/733 |
| 6,330,486 B1 | 12/2001 | Padula | |
| 7,099,482 B1 | 8/2006 | Jot et al. | 381/61 |
| 7,266,207 B2 | 9/2007 | Wilcock et al. | |
| 7,492,915 B2 | 2/2009 | Jahnke | |
| 7,840,668 B1 | 11/2010 | Sylvain | |
| 8,187,093 B2 | 5/2012 | Hideya et al. | |
| 8,189,813 B2 | 5/2012 | Muraoka et al. | |
| 8,411,880 B2 | 4/2013 | Wang et al. | |
| 8,509,454 B2 | 8/2013 | Kirkeby et al. | |
| 8,831,255 B2 | 9/2014 | Crawford et al. | |
| 8,990,078 B2 | 3/2015 | Nakadai et al. | |
| 9,161,147 B2 | 10/2015 | Korn | |
| 9,179,232 B2 | 11/2015 | Jarske et al. | |
| 9,197,979 B2 | 11/2015 | Lemieux et al. | |
| 9,215,539 B2 | 12/2015 | Kim et al. | |
| 9,271,081 B2 | 2/2016 | Corteel et al. | |

(Continued)

FOREIGN PATENT DOCUMENTS

| | | |
|---|---|---|
| CN | 1857027 A | 11/2006 |
| CN | 101999067 A | 3/2011 |

(Continued)

OTHER PUBLICATIONS

Li, Loco Radio Designing High Density Augmented Reality Audio Browsers, PhD Thesis Final, MIT, 2014.

(Continued)

*Primary Examiner* — Andrey Belousov
(74) *Attorney, Agent, or Firm* — Harrington & Smith

(57) ABSTRACT

A method including, detecting interaction between the user and an audio-object via local tracking, determining an audio-object state modification based on the local tracking, and performing an audio-object interaction based on the audio-object state modification.

20 Claims, 11 Drawing Sheets

(56) References Cited

U.S. PATENT DOCUMENTS

| | | |
|---|---|---|
| 2002/0150254 A1* | 10/2002 | Wilcock ............... G06F 3/167 381/1 |
| 2006/0025216 A1 | 2/2006 | Smith |
| 2008/0144864 A1 | 6/2008 | Huon |
| 2008/0247567 A1 | 10/2008 | Kjolerbakken et al. |
| 2009/0138805 A1* | 5/2009 | Hildreth ............ G06K 9/00335 715/745 |
| 2009/0240359 A1 | 9/2009 | Hyndman |
| 2009/0253512 A1 | 10/2009 | Nickell |
| 2009/0262946 A1 | 10/2009 | Dunko |
| 2010/0098274 A1 | 4/2010 | Hannemann et al. |
| 2010/0119072 A1 | 5/2010 | Ojanpera |
| 2010/0169796 A1 | 7/2010 | Lynk |
| 2010/0208905 A1 | 8/2010 | Franck et al. |
| 2011/0002469 A1 | 1/2011 | Ojala |
| 2011/0129095 A1 | 6/2011 | Avendano et al. |
| 2011/0166681 A1 | 7/2011 | Lee et al. |
| 2012/0027217 A1 | 2/2012 | Jun et al. |
| 2012/0093320 A1 | 4/2012 | Flaks et al. ............ 381/17 |
| 2012/0230512 A1 | 9/2012 | Ojanpera |
| 2012/0232910 A1 | 9/2012 | Dressler et al. |
| 2012/0295637 A1 | 11/2012 | Hannuksela |
| 2013/0114819 A1 | 5/2013 | Melchior et al. |
| 2013/0259243 A1 | 10/2013 | Herre et al. |
| 2013/0321396 A1 | 12/2013 | Kirk |
| 2013/0321586 A1 | 12/2013 | Kirk et al. |
| 2014/0010391 A1 | 1/2014 | Ek et al. |
| 2014/0133661 A1 | 5/2014 | Harma et al. ............ 381/22 |
| 2014/0153753 A1 | 6/2014 | Crockett ............ 381/307 |
| 2014/0285312 A1 | 9/2014 | Laaksonen |
| 2014/0328505 A1 | 11/2014 | Heinemann et al. |
| 2014/0350944 A1 | 11/2014 | Jot et al. |
| 2014/0361976 A1 | 12/2014 | Osman |
| 2015/0002388 A1 | 1/2015 | Weston et al. |
| 2015/0003616 A1 | 1/2015 | Middlemiss et al. |
| 2015/0055937 A1 | 2/2015 | Van Hoff et al. |
| 2015/0063610 A1 | 3/2015 | Mossner |
| 2015/0078594 A1 | 3/2015 | Mcgrath et al. ............ 381/300 |
| 2015/0116316 A1 | 4/2015 | Fitzgerald et al. |
| 2015/0146873 A1 | 5/2015 | Chabanne et al. ............ 7/305 |
| 2015/0223002 A1 | 8/2015 | Mehta et al. ............ 7/30 |
| 2015/0245153 A1 | 8/2015 | Malak ............ 381/57 |
| 2015/0263692 A1 | 9/2015 | Bush |
| 2015/0302651 A1 | 10/2015 | Shpigelman |
| 2015/0316640 A1 | 11/2015 | Jarske et al. |
| 2016/0050508 A1 | 2/2016 | Redmann |
| 2016/0084937 A1 | 3/2016 | Lin |
| 2016/0112819 A1 | 4/2016 | Mehnert et al. |
| 2016/0125867 A1 | 5/2016 | Jarvinen et al. |
| 2016/0142830 A1 | 5/2016 | Hu |
| 2016/0150267 A1 | 5/2016 | Strong |
| 2016/0150345 A1 | 5/2016 | Jang |
| 2016/0182944 A1 | 6/2016 | Han et al. ............ H04N 21/4396 |
| 2016/0192105 A1 | 6/2016 | Breebaart et al. |
| 2016/0212272 A1 | 7/2016 | Srinivasan et al. |
| 2016/0227337 A1 | 8/2016 | Goodwin et al. |
| 2016/0227338 A1 | 8/2016 | Oh et al. |
| 2016/0266865 A1 | 9/2016 | Tsingos |
| 2016/0300577 A1 | 10/2016 | Fersch et al. |
| 2016/0313790 A1 | 10/2016 | Clement et al. |
| 2017/0077887 A1 | 3/2017 | You |
| 2017/0110155 A1 | 4/2017 | Campbell et al. |
| 2017/0150252 A1 | 5/2017 | Trestain et al. |
| 2017/0165575 A1 | 6/2017 | Ridihalgh et al. |
| 2017/0169613 A1 | 6/2017 | VanBlon et al. |
| 2017/0208415 A1 | 7/2017 | Ojala |
| 2017/0223478 A1 | 8/2017 | Jot et al. |
| 2017/0230760 A1 | 8/2017 | Sanger et al. |
| 2017/0289486 A1 | 10/2017 | Stroffolino |
| 2017/0295446 A1 | 10/2017 | Thagadur Shivappa |
| 2017/0366914 A1 | 12/2017 | Stein et al. |
| 2019/0329129 A1 | 10/2019 | Fajt et al. |

FOREIGN PATENT DOCUMENTS

| | | |
|---|---|---|
| CN | 102668374 A | 9/2012 |
| CN | 102855133 A | 1/2013 |
| CN | 103702072 A | 4/2014 |
| CN | 104010265 A | 8/2014 |
| CN | 104041081 A | 9/2014 |
| CN | 104737557 A | 6/2015 |
| CN | 105611481 A | 5/2016 |
| EP | 2688318 A1 | 1/2014 |
| GB | 2540175 A | 1/2017 |
| WO | WO-2009092060 A2 | 7/2009 |
| WO | WO-2009128859 A1 | 10/2009 |
| WO | WO-2010/020788 A1 | 2/2010 |
| WO | WO-2011020065 A1 | 2/2011 |
| WO | WO-2011020067 A1 | 2/2011 |
| WO | WO-2013/064943 A1 | 5/2013 |
| WO | WO-2013/155217 A1 | 10/2013 |
| WO | WO-2014/130221 A1 | 8/2014 |
| WO | WO-2014168901 A1 | 10/2014 |
| WO | WO-2015152661 A1 | 10/2015 |
| WO | WO-2016014254 A1 | 1/2016 |
| WO | WO-2017120681 A1 | 7/2017 |

OTHER PUBLICATIONS

Simon Galvez, Marcos F.;Menzies, Dylan; Fazi, Filippo Maria; de Campos, Teofilo; Hilton, Adrian "*A Listener Position Adaptive Stereo System for Object-Based Reproduction*" http://www.aes.org/e-lib/browse.cfm?elib=17670 dated May 6, 2015.

Hatala, Marek et al., "Ontology-Based User Modeling in an Augmented Audio Reality System for Museums", http://citeseerx.ist.psu.edu/viewdoc/download?doi=10.1.1.91.5712&rep=rep1&type=pdf; Aug. 29, 2016, 38 pgs.

Gunel, Banu et al., "Spatial Synchronization of Audiovisual Objects by 3D Audio Object Coding", IEEE 2010, pp. 460-465; https://www.researchgate.net/profile/E_Ekmekcioglu/publication/251975482_Spatial_synchronization_of_audiovisual_objects_by_3D_audio_object_coding/links/54e783660cf2f7aa4d4d858a.pdf>, 2010.

"Unity 3D Audio"; Nov. 8, 2011; whole document (9 pages).

Wozniewski, M. et al.; "User-Specific Audio Rendering and Steerable Sound for Distributed Virtual Environments"; Proceedings of the 13th International Conference on Auditory Display; Montréal, Canada; Jun. 26-29, 2007; whole document (4 pages).

Micah T. Taylor, Anish Chandak, Lakulish Antani, Dinesh Manocha, "*RESound: Interactive Sound Rendering for Dynamic Virtual Enviroments*" MM'09, Oct. 19-24, 2009, Beijing, China. http://gamma.cs.unc.edu/Sound/RESound/.

Cameron Faulkner, "*Google's Adding Immersive Audio to your Virtual Reality Worlds*" http://www.in.techradar.com/news/misc/googlesaddingimmersiveaudiotoyourvrworlds/articleshow/57191578.cms retrieved Feb. 16, 2017.

Alessandro Pieropan, Giampiero Salvi, Karl Pauwels, Hedvig Kjellstrom Audio-Visual Classification and Detection of Human Manipulation Actions [https://www.csc.kth.se/-hedvig/publications/iros_14.pdf] retrieved Sep. 29, 2017.

Anil Camci, Paul Murray, Angus Graeme Forbes, "*A Web-based UI for Designing 3D Sound Objects and Virtual Sonic Enviroments*" Electronic Visualization Laboratory, Department of Computer Science, University of Illinois at Chicago retrieved May 16, 2017.

Henney Oh "The Future of VR Audio—3 Trends to Track This Year" dated Jul. 4, 2017.

Carl Schissler, Aaron Nicholls, and Ravish Mehra "Efficient HRTF-Based Spatial Audio for Area and Volumetric Sources" [retrieved Jan. 31, 2018].

Hasan Khaddour, Jiri Schimmel, Frantisek Rund "A Novel Combined System of Direction Estimation and Sound Zooming of Multiple Speakers" Radioengineering, vol. 24, No. 2, Jun. 2015.

\* cited by examiner

METADATA-FREE AUDIO-OBJECT INTERACTIONS

BACKGROUND

Technical Field

The exemplary and non-limiting embodiments relate generally to rendering of free-viewpoint audio for presentation to a user using a spatial rendering engine.

Brief Description of Prior Developments

Free-viewpoint audio generally allows for a user to move around in the audio (or generally, audiovisual or mediated reality) space and experience the audio space in a manner that correctly corresponds to his location and orientation in it. This may enable various virtual reality (VR) and augmented reality (AR) use cases. The spatial audio may consist, for example, of a channel-based bed and audio-objects, audio-objects only, or any equivalent spatial audio representation. While moving in the space, the user may come into contact with audio-objects, the user may distance themselves considerably from other objects, and new objects may also appear. The listening/rendering point may thereby adapt to the user's movement, and the user may interact with the audio-objects, and/or the audio content may otherwise evolve due to the changes relative to the rendering point or user action.

SUMMARY

The following summary is merely intended to be exemplary. The summary is not intended to limit the scope of the claims.

In accordance with one aspect, an example method comprises, detecting interaction between the user and an audio-object via local tracking, determining an audio-object state modification based on the local tracking, and sending the audio-object state modification to an audio-object spatial rendering engine.

In accordance with another aspect, an example apparatus comprises at least one processor; and at least one non-transitory memory including computer program code, the at least one memory and the computer program code configured to, with the at least one processor, cause the apparatus to: detect interaction between the user and an audio-object via local tracking, determine an audio-object state modification based on the local tracking, and send the audio-object state modification to an audio-object spatial rendering engine.

In accordance with another aspect, an example apparatus comprises a non-transitory program storage device readable by a machine, tangibly embodying a program of instructions executable by the machine for performing operations, the operations comprising: detecting interaction between the user and an audio-object via local tracking, determining an audio-object state modification based on the local tracking, and sending the audio-object state modification to an audio-object spatial rendering engine.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
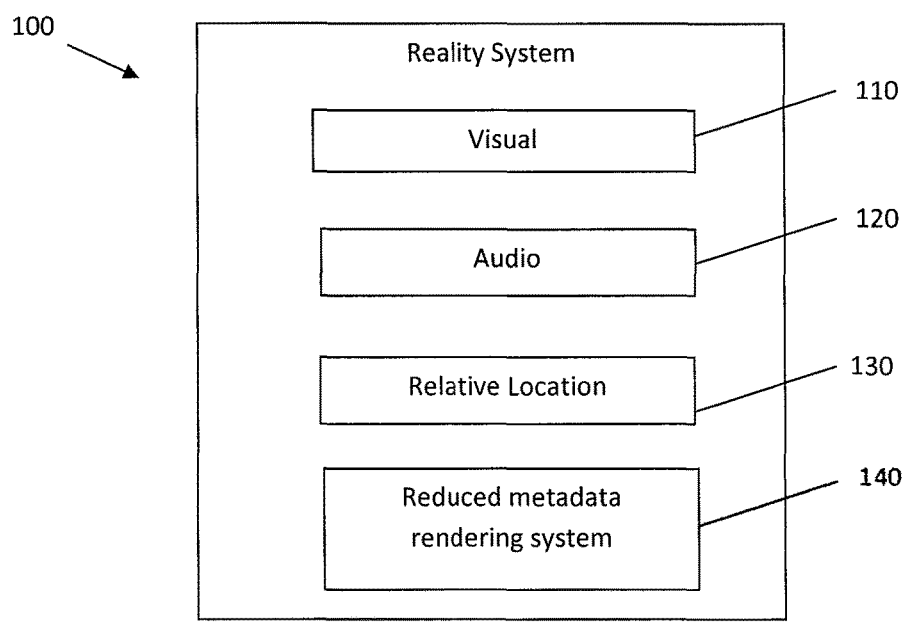
FIG. 1 is a diagram illustrating a reality system comprising features of an example embodiment.

Referring to FIG. 1, a diagram is shown illustrating a reality system 100 incorporating features of an example embodiment. The reality system 100 may be used by a user for augmented-reality (AR), virtual-reality (VR), or presence-captured (PC) experiences and content consumption, for example, which incorporate free-viewpoint audio. Although the features will be described with reference to the example embodiments shown in the drawings, it should be understood that features can be embodied in many alternate forms of embodiments.

The system 100 generally comprises a visual system 110, an audio system 120, a relative location system 130 and a reduced metadata (or a metadata free) rendering system 140. The visual system 110 is configured to provide visual images to a user. For example, the visual system 12 may comprise a virtual reality (VR) headset, goggles or glasses. The audio system 120 is configured to provide audio sound to the user, such as by one or more speakers, a VR headset, or ear buds for example. The relative location system 130 is configured to sense a location of the user, such as the user's head for example, and determine the location of the user in the realm of the reality content consumption space. The movement in the reality content consumption space may be based on actual user movement, user-controlled movement, and/or some other externally-controlled movement or pre-determined movement, or any combination of these. The user is able to move and turn their head in the content consumption space of the free-viewpoint. The relative location system 130 may be able to change what the user sees and hears based upon the user's movement in the real-world; that real-world movement changing what the user sees and hears in the free-viewpoint rendering.

The movement of the user, interaction with audio-objects and things seen and heard by the user may be defined by predetermined parameters including an effective distance parameter and a reversibility parameter. An effective distance parameter may be a core parameter that defines the distance from which user interaction is considered for the current audio-object. In some embodiments, the effective distance parameter may also be considered a modification adjustment parameter, which may be applied to modification of interactions, as described in U.S. patent application Ser. No. 15/293,607, filed Oct. 14, 2016, which is hereby incorporated by reference. A reversibility parameter may also be considered a core parameter, and may define the reversibility of the interaction response. The reversibility parameter may also be considered a modification adjustment parameter. Although particular modes of audio-object interaction are described herein for ease of explanation, brevity and simplicity, it should be understood that the methods described herein may be applied to other types of audio-object interactions.

The user may be virtually located in the free-viewpoint content space, or in other words, receive a rendering corresponding to a location in the free-viewpoint rendering. Audio-objects may be rendered to the user at this user location. The area around a selected listening point may be defined based on user input, based on use case or content specific settings, and/or based on particular implementations of the audio rendering. Additionally, the area may in some embodiments be defined at least partly based on an indirect user or system setting such as the overall output level of the system (for example, some sounds may not be audible when the sound pressure level at the output is reduced). In such instances the output level input to an application may result in particular sounds being not rendered because the sound level associated with these audio-objects may be considered imperceptible from the listening point. In other instances, distant sounds with higher output levels (such as, for example, an explosion or similar loud event) may be exempted from the requirement (in other words, these sounds may be rendered). A process such as dynamic range control may also affect the rendering, and therefore the area, if the audio output level is considered in the area definition.

The reduced metadata rendering system 140 is configured to enable controlled audio-object interactions without needing transmission of any associated metadata. Thus, the method allows for a new alternative implementation of an audio-object interaction system. The reduced metadata rendering system 140 may furthermore enable audio-object interactions in free-viewpoint audio experiences for such content that does not include the metadata required by other rendering systems. The reduced metadata rendering system 140 may implement rendering of free-viewpoint (or free-listening point; six-degrees-of-freedom; 6DoF, for example) audio for presentation to a user using a spatial rendering engine. In some implementations, reduced metadata rendering system 140 may use an audio-object spatial modification engine or the spatial rendering engine may include functionality of an audio-object spatial modification engine.

The reduced metadata rendering system 140 may implement processes for controlled audio-object interactions without needing transmission of any associated metadata, or metadata-free controlled audio-object interactions, based on a local tracking of user movement and activity. Specifically, reduced metadata rendering system 140 may track 1) a distance between the user and the audio-object to determine an interaction area in which we consider audio-object interactions, and 2) a user movement relative to the audio-object (within the interaction area) to determine transitions between interaction states.

The interaction states may each correspond to an interaction event (a user activity model and an audio-object interaction response). The interaction states may be defined by the implementer or derived, for example, from an interaction event database. The transitions between the states (or interaction events) may thereby be used to trigger each separate type of audio-object interaction response. The relevant responses may differ between content, use case, and implementation. None of the responses depend on any transmitted metadata.

At least one distance related to initializing the local tracking may be defined by the implementer or, for example, a content creator. In some embodiments, this distance may be derived automatically based, for example, on past user behavior while consuming free-viewpoint audio.

Reduced metadata rendering system 140 may define the interaction area via local tracking and thereby enable stabilization of the audio-object rendering at a variable distance to the audio-object depending on real user activity. In other words, the response of the reduced metadata rendering system 140 may be altered (for example, the response may be slightly different) each time, thereby improving the realism of the interaction. The reduced metadata rendering system 140 may track the user's local activity and further enable making of intuitive decisions on when to apply specific interaction rendering effects to the audio presented to the user. Reduced metadata rendering system 140 may implement these steps together to significantly enhance the user experience of free-viewpoint audio where no or only a reduced set of metadata is available.

Figure 2:
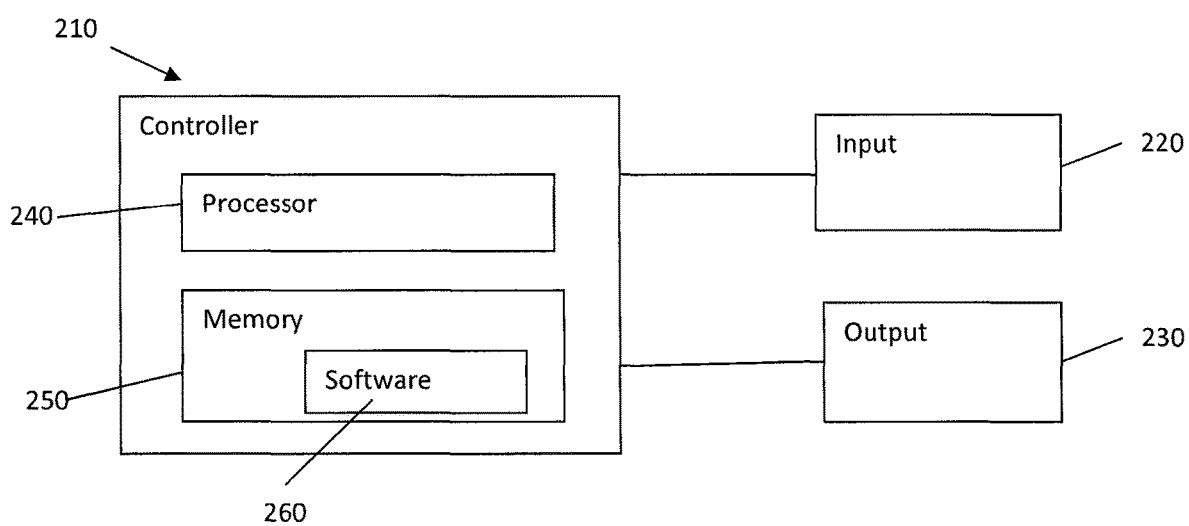
FIG. 2 is a diagram illustrating some components of the system shown in FIG. 1.

Referring also to FIG. 2, the reality system 100 generally comprises one or more controllers 210, one or more inputs 220 and one or more outputs 230. The input(s) 220 may comprise, for example, location sensors of the relative location system 130 and the reduced metadata rendering system 140, rendering information for reduced metadata rendering system 140, reality information from another device, such as over the Internet for example, or any other suitable device for inputting information into the system 100. The output(s) 230 may comprise, for example, a display on a VR headset of the visual system 110, speakers of the audio system 120, and a communications output to communication information to another device. The controller(s) 210 may comprise one or more processors 240 and one or more memory 250 having software 260 (or machine-readable instructions)

Figure 3A:
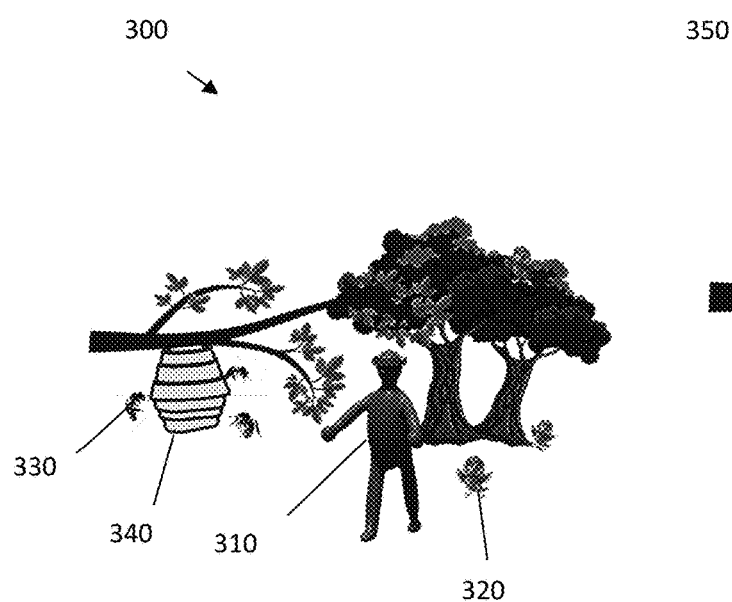
FIGS. 3a and 3b are diagrams illustrating characteristics of free-viewpoint content consumption.
Figure 3B:
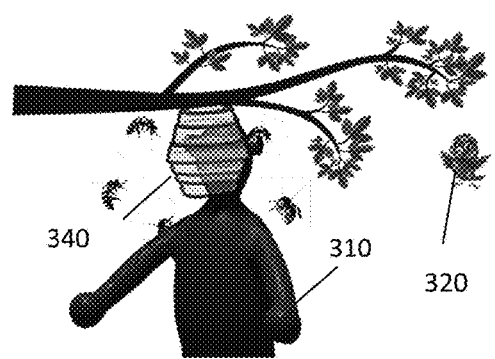

Referring also to FIGS. 3a and 3b, diagrams 300, 350 illustrating characteristics of free-viewpoint content consumption are shown.

FIG. 3a illustrates a user 310 navigating around an audiovisual free-viewpoint VR experience 300. The user 310 is surrounded by a nature scene, where the user 310 hears, for example, birds singing 320 around the user 310 and bees buzzing 330 at some distance in front of the user 310. As the user 310 moves forward (FIG. 3b), the user 310 may come into contact with the beehive 340 that may, in terms of audio (or audio-wise), consist, for example, of a single audio-object. This is an example use case in which a definition for an interaction between the user and the audio-object is required for an immersive free-viewpoint audio experience.

Existing systems for audio-object interactions in free-viewpoint audio (for example, systems as described in U.S. patent application Ser. No. 15/293,607, and similar systems) may utilize metadata for defining how the interactions should be detected and how they modify the rendering. For example, in FIG. 3b, the audio-object rendering may be modified based on instructions derived from the metadata to amplify and accelerate the buzzing of the bees in a circle around the user 310 and make the sound of the bees 330 to follow the user 310 for a while even if the user tried to leave this part of the scene. While this approach to modification may allow for well-defined and truly immersive user experiences, there may also be problems arising from mobile use cases as well as with regard to rendering of content that does not include metadata (for example, legacy content for some systems).

In some instances, the metadata associated with the audio-object interactions may add a considerable amount of overhead to the transmission. In instances of high-end VR applications the overhead associated with audio-object interactions may not significantly affect performance (especially if there is also high-quality video content whose bit rate typically dominates the consumption). However, in instances of low bit rate AR audio solutions or while under severe network congestion, the overhead associated with audio-object interactions may make it difficult to apply these advanced features (especially if the audio-object interactions are dynamic and thus require frequent metadata updates). On the other hand, in other instances there may be (a considerable amount of) VR/AR content, or other audiovisual content that may be adapted for free-viewpoint VR/AR use, that does not include these advanced metadata for audio-object interactions.

Reduced metadata rendering system 140 may implement a metadata-free system as an alternative and/or a backup for a system that includes advanced metadata for audio-object interactions to better allow audio-object interactions also for low bit rate AR scenarios and for improved rendering of content (for example, legacy content) that does not have the required metadata.

Reduced metadata rendering system 140 may enable audio-object interactions without metadata based on instructions, which, from a content creator's perspective, may appear to be arbitrary. However, the interaction rendering cannot follow the content creator's instructions without any metadata indicating this. In instances of content that does not consider audio-object interactions (such as, for example, legacy content) there may be no content creator input initially. Reduced metadata rendering system 140 may provide an improved user experience in these instances.

Figure 4:
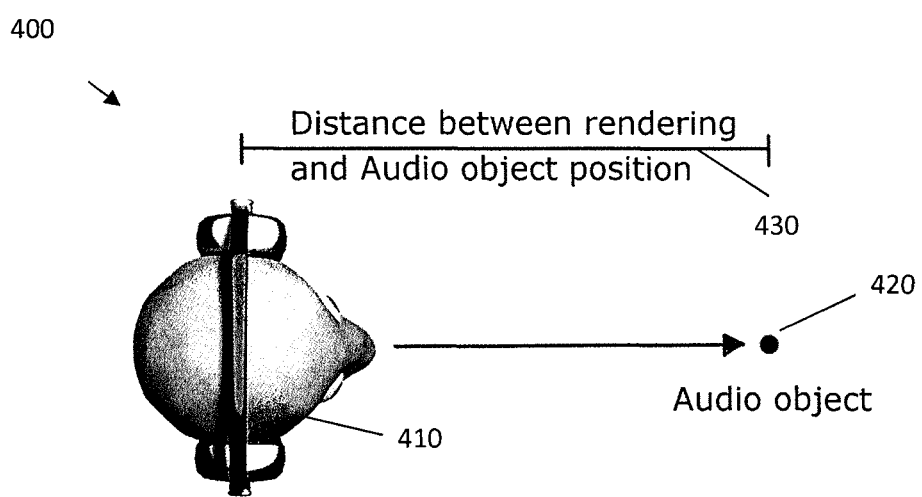
FIG. 4 is an example illustration of a relationship between a user rendering position and an audio-object position.

Referring also to FIG. 4, an example illustration 400 of a relationship between a user rendering position 410 and an audio-object position 420 based on a main trackable parameter 430 (in this instance, a distance between the user and audio-object) when no metadata related to audio-object interactions is used is shown.

Figure 5:
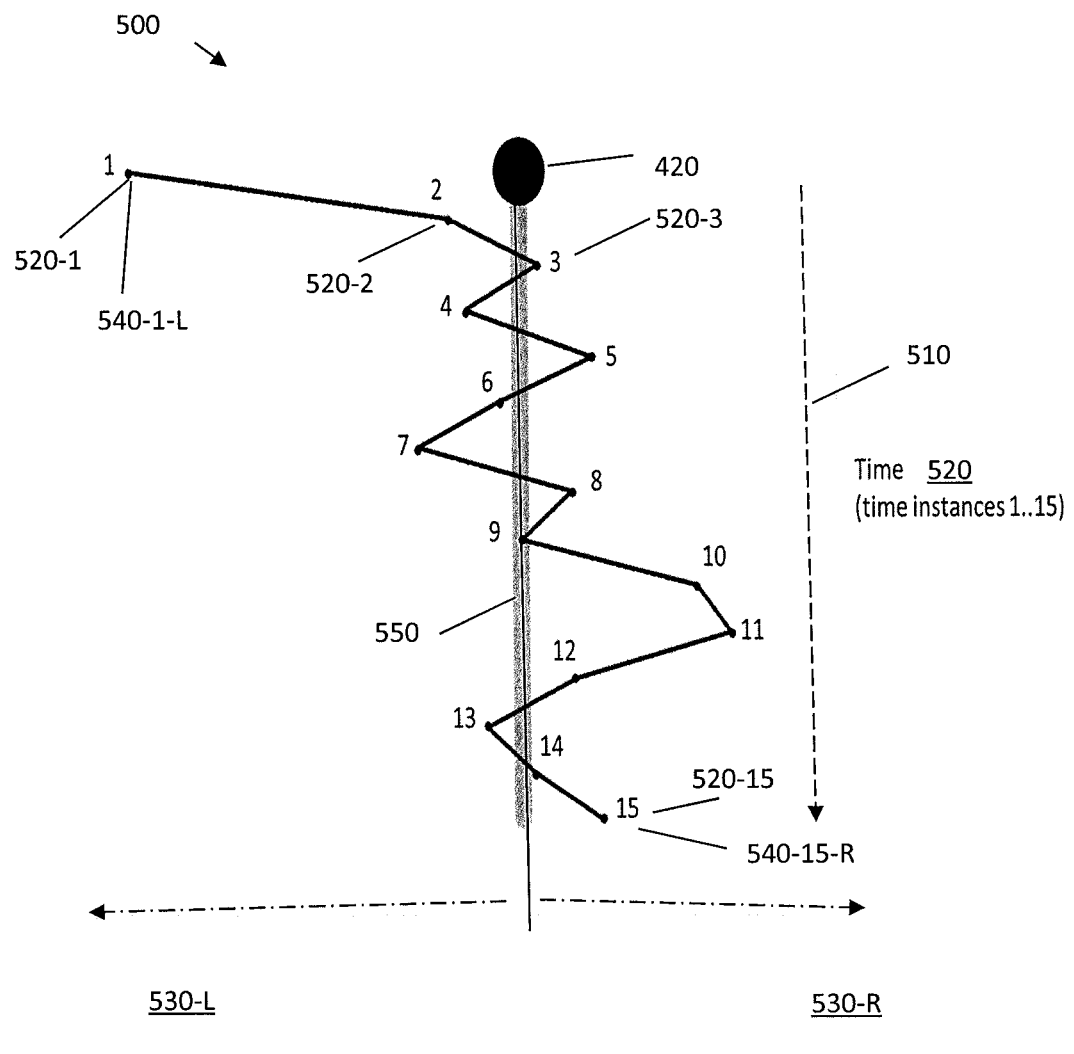
FIG. 5 is an example illustration of a user rendering position against audio-object position over time.

Referring also to FIG. 5, an example illustration 500 of a user rendering position 410 against an audio-object position 420 over time 510 is shown. A distance of the user 410 from a middle line 550 of the audio-object 420 is shown (530-L denotes a distance from the middle line 550 in a left area while 530-R denotes the distance from the middle line 550 in the right area). The user position (for example, in relation to the audio-object position) is illustrated in a single dimension (left-to-right) with time 510 being illustrated on the vertical axis.

FIGS. 4 and 5, present illustrations showing the distance between the user rendering position 410 and the audio-object position 420. This distance may be tracked by reduced metadata rendering system 140. Reduced metadata rendering system 140 may thereby determine a portion of the information related to the overlap of the two positions before the actual overlap takes place and as the user 410 moves towards the audio-object. FIG. 5 illustrates the user in FIG. 3a moving towards the audio-object. In this case, reduced metadata rendering system 140 may track the distance 540 (of the user) along a single dimension (for example, the left to right movement of FIG. 4) at several time instances 520 (shown in FIG. 5 as 1, 2, 3, etc.).

In FIG. 5, the user 410 is at time instance 1 (shown as 520-1) at a considerable distance (shown as 540-1-L) from the audio-object. This corresponds to the situation of FIG. 4. At time instance 520 2, the user 410 has moved significantly closer to the audio-object. The audio-object may now appear very close to the user's head. The user 410 stops, but there may still be small changes to the distance due to subtle movements of the user 410. The user 410 may, for example, turn their head to view the scene, make small nods, correct their posture, or take a small step in any direction. The audio-object 420 may thus end up oscillating around the user 410 along at least one dimension, as illustrated for time instances 520 2-9 in FIG. 5 (shown as single numerals 2, 3 to 9, in FIG. 5). This may provide a very disturbing user experience when the audio-object 420 is rendered to the user 410. Reduced metadata rendering system 140 may control the rendering such that it would appear more pleasant (for example, stable with smooth transitions) for the user 410. In addition to removing disturbances, reduced metadata rendering system 140 may implement processes (for example, based on a second target of control for the audio-object interaction) to provide new information or an enhanced experience, for example as discussed above with respect to FIGS. 3a and 3b.

Figure 6:
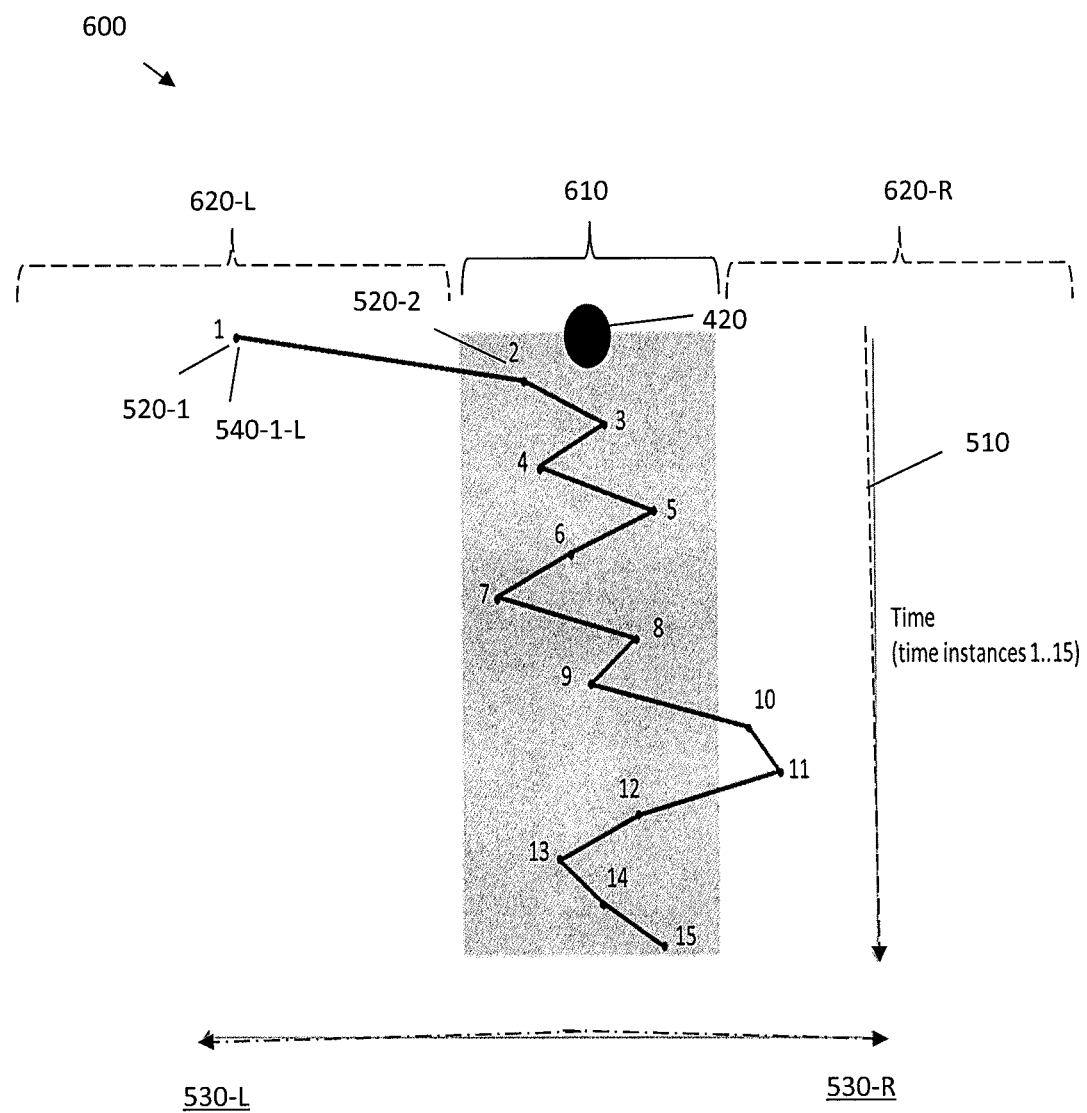
FIG. 6 is another example illustration of a user rendering position against audio-object position over time.

FIG. 6 is an example illustration 600 of user rendering position against audio-object position over time. The position is illustrated in a single dimension (left-to-right) with time 510 being illustrated on the vertical axis.

As illustrated with respect to FIG. 6, reduced metadata rendering system 140 may determine an additional area (for example, reduced metadata rendering system 140 may augment FIG. 5) by adding a region 610 (for example, in place of the "audio-object center point line" 540, shown in FIG. 5) to better indicate that the user rendering position and audio-object distances fall into two categories: the audio-object 420 is either close to the rendering position (within region 610) or not close to it (within area 620-L or 620-R, which may correspond to extended areas outside of region 610). Reduced metadata rendering system 140 may implement processes to ensure that the user 410 response 1) does not hear blurry or oscillating audio-object position changes in the rendering for time instances 520 2-9 and 12-15, and response 2) may instead hear a change in the audio-object rendering corresponding to an interaction trigger. Reduced metadata rendering system 140 (or any audio rendering system) may require metadata to implement response 2) (for example, without metadata response 2 may be difficult or impossible to execute). Reduced metadata rendering system 140 may implement processes for time instances 520 10-11 in FIG. 6, in which the user leaves and is outside of the region 610.

According to an example, reduced metadata rendering system 140 may implement a distance tracking process for triggering and maintaining an audio-object interaction. Reduced metadata rendering system 140 may implement the distance tracking process to calculate a distance between the user rendering position and the audio-object position. This value (for example, the distance) and its change may be tracked over time. Reduced metadata rendering system 140 may thereby define whether the user rendering position relative to the audio-object position is within an area (for example region 610) where audio-object interaction may be considered.

Referring back to FIG. 6, reduced metadata rendering system 140 may define a value for the "size of the area" 610 that is to be considered "close" and correspondingly, areas that are "not so close". The value(s) may be adaptive or dynamic. Reduced metadata rendering system 140 may define for each implementation or each general content type a distance/radius that corresponds to the correct size of region 610. Reduced metadata rendering system 140 may define the area in a dynamic free-viewpoint audio use case in specific ways and additionally, or alternatively, reduced metadata rendering system 140 may trigger and control an audio-object interaction using this area definition and related criteria.

Reduced metadata rendering system 140 may implement area definition to provide a way for triggering and controlling audio-object interactions. Reduced metadata rendering system 140 may implement a dynamic area definition instances in which a static area definition is not optimal. Reduced metadata rendering system 140 may implement a static area definition for a simple stabilization of the rendering. In addition, due to the nature of the user-on-audio-object overlaps and interaction in the virtual space, reduced metadata rendering system 140 may center the area 610 at positions other than the audio-object 420 although the area 610 is to cover the audio-object 420. For example, in a particular instance, the user 100 may be interacting with an audio-object 420 on one side of the audio-object 420, and then decide to move away, for example, through said audio-object 420 (for example, on the other side of said audio-object 420). If the area was centered at the audio-object 420, the audio-object interaction would continue longer than required by the corresponding (for example, real world based) logic of the implementation. Reduced metadata rendering system 140 may therefore define a dynamic interaction area that may change at least one of its size or its location based on the observed action of the user 410 in relation to the audio-object 420 and the audio-object location. Reduced metadata rendering system 140 may, in other words, track the local activity of the user 410 relative to the audio-object 420 while the user 410 is in the vicinity of the audio-object 420.

Figure 7:
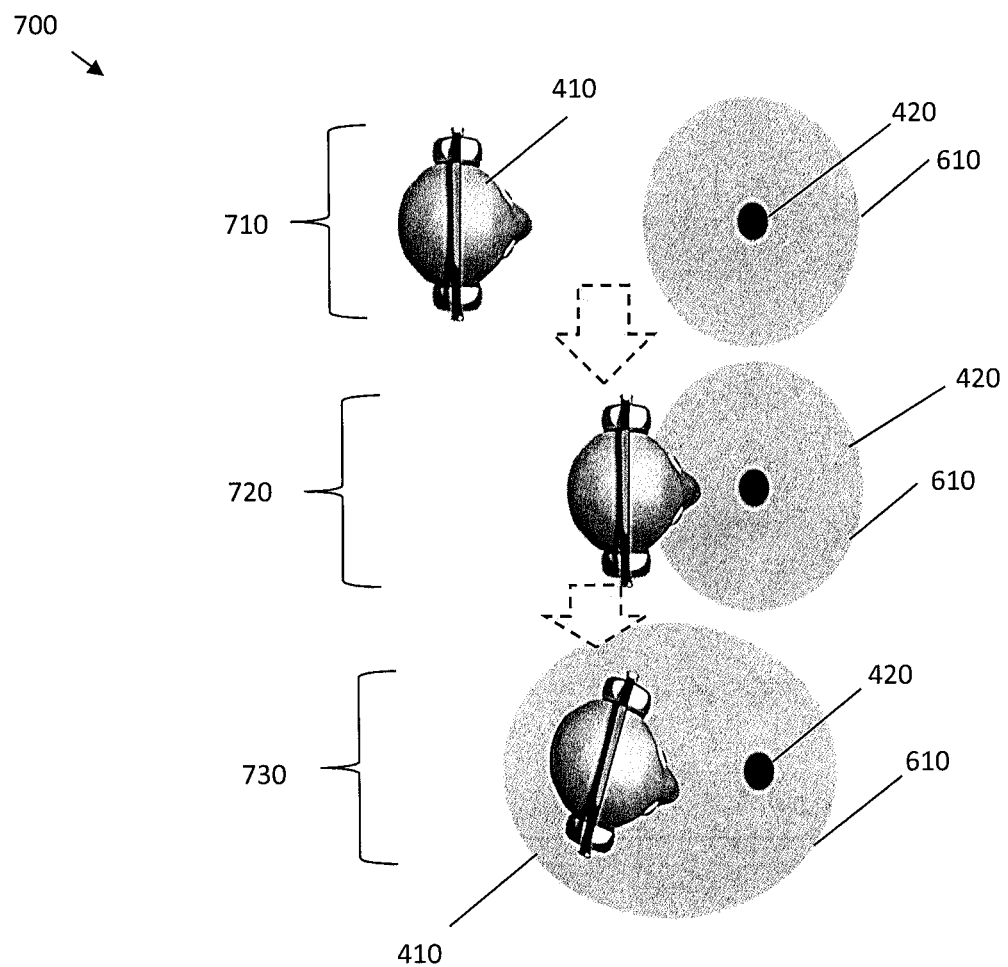
FIG. 7 is an example illustration of a user relationship to a local tracking area of an audio-object.

Referring also to FIG. 7, an example illustration of a user relationship 700 to a local tracking area of an audio-object, is shown.

An initial stage 710, illustrates a user 410 approaching a local tracking area 610 of an audio-object 420, stage 720 illustrates the user 410 entering the local tracking area 610 and triggering an audio-object interaction, and stage 730 illustrates the local tracking area 610 being adjusted based on local user tracking.

Reduced metadata rendering system 140 may implement location tracking and area definition. FIG. 7 illustrates (different stages of) a user approaching (and entering a local tracking area of) an audio-object 420. Reduced metadata rendering system 140 may specify an implementation-specific distance around the audio-object 420 where the local tracking is initially considered (and where reduced metadata rendering system 140 may also begin to consider the audio-object interaction). The distance may also be user-configurable, defined by the content creator (and loaded, for example, once per session) or, in advanced embodiments, based on an ongoing process (for example, based on a learning algorithm) that accumulates user-specific data over time and thus allows automatic personalization of the experience.

The distance may correspond to a static area centered at the audio-object 420, for example as shown at stage 710. As the user moves closer, he reaches the border of the tracked distance and triggers an audio-object interaction, for example as shown at stage 720. We may thus begin the local tracking when the user enters this pre-defined area around the audio-object. Alternatively, there may be different decision distances for the tracking and the actual interaction part. In this example, to simplify the description, the decision distances for the tracking and the actual interaction may be consider a same single distance. The local tracking may be seen as defining a "center of mass" that is based on the user rendering position and the audio-object position, for example as shown at stage 730.

Figure 8:
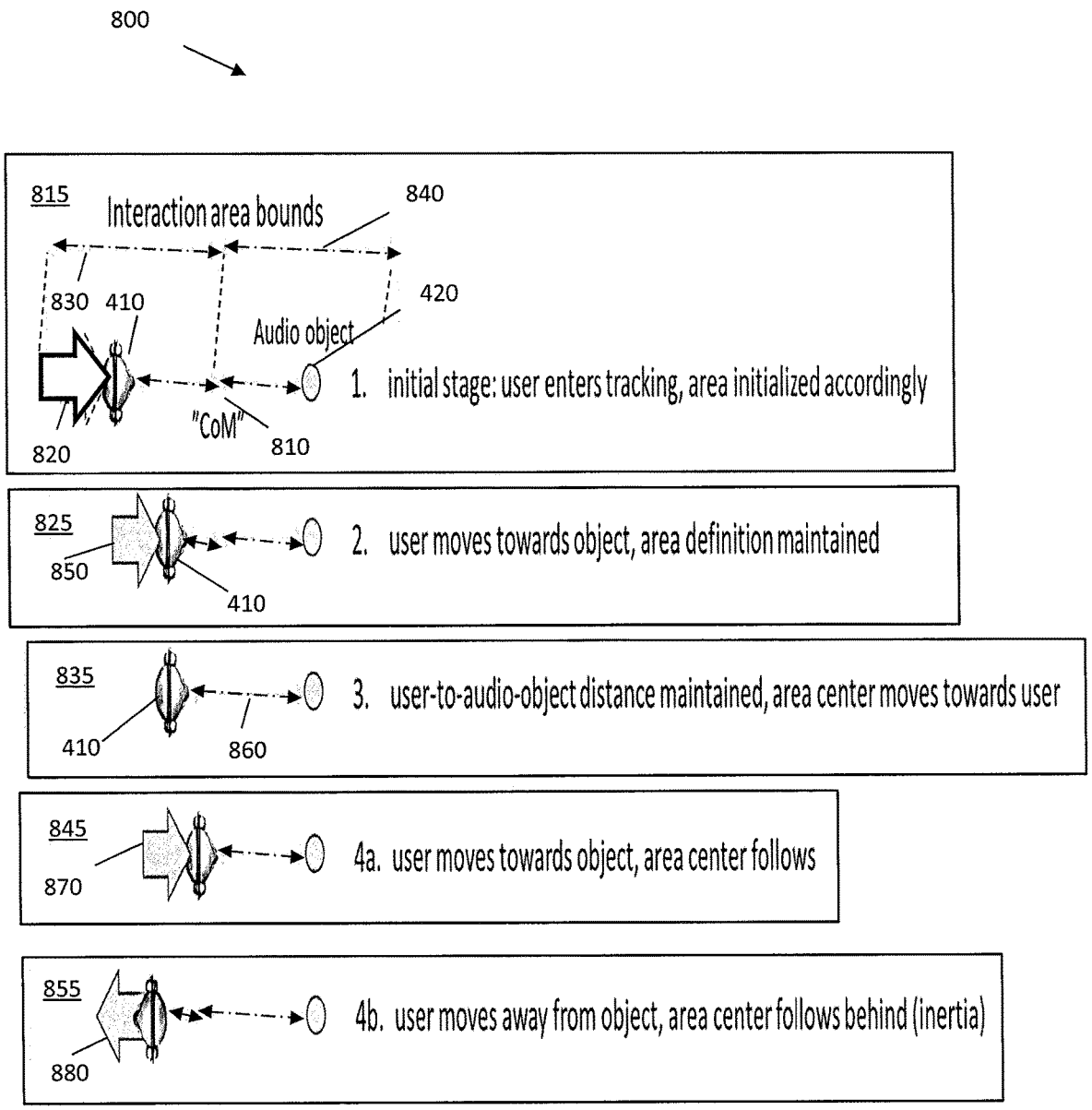
FIG. 8 is an illustration of interaction-area modification control instructions.

Referring also to FIG. 8 an illustration of interaction-area modification control instructions is shown. These interaction-area modification control instructions may be based on corresponding basic instructions (corresponding to implementer defined logic or principles, such as based on real world scenarios) regarding the modification of interaction-areas in response to particular user motion.

Reduced metadata rendering system 140 may implement instructions based on a model for controlling the dynamic interaction area (or center of mass/CoM) 810. Reduced metadata rendering system 140 may implement interaction-area tracking and modification based on core instructions or guidelines (for example, basic principles), such as shown in FIG. 8. With the user 410 entering the tracking distance 820 (shown at stage 1, block 815 in FIG. 8), the reduced metadata rendering system 140 may initialize CoM 810 at a point between the user position and the audio-object 420. This may correspond to interaction area bounds 830, 840 for the user 410 and audio-object 420. The exact location of the CoM 810 may depend on the implementation and/or attributes such as the audio-object size. The initial location may be, for example, the center point between the user position and the audio-object position.

After initialization, reduced metadata rendering system 140 may begin the local tracking. Step 2, block 825, of FIG. 8 illustrates the user 410 approaching 850 the CoM 810, the position of which is maintained.

As the user 410 stops (or the absolute distance between the user 410 and the audio-object 420 is otherwise maintained), the CoM 810 may move towards the user 410 as seen in step 3, block 835. This movement may become slower the farther away from the audio-object the CoM 810 goes. At some point the CoM 810 may meet the user position, and reduced metadata rendering system 140 may center the interaction area at the user position 860. The interaction area may, in some embodiments, also cover the actual audio-object position. Reduced metadata rendering system 140 may therefore render the audio-object 420 with the user 410 (and not render the audio-object separately). Reduced metadata rendering system 140 may control the rendering via the interaction area.

Steps 4*a* and 4*b* (blocks 845 and 855) demonstrate two possibilities where the user-to-audio-object distance is changed (after the user position and CoM 810 have merged). In step 4*a*, block 845, the user 410 may move towards 870 the audio-object and the CoM 810 may follow the user position.

In step 4*b*, block 855, the user 410 may move away from the audio-object position. In this case, the CoM 810 may separate 880 from the user position. The separation may, depending on the implementation (and various criteria such as the current distance to the audio-object) result in the CoM 810 being maintained or the CoM 810 following the user position with a lag (inertia).

In some embodiments, the CoM 810 may move towards the audio-object 420 if the user-to-audio-object distance becomes larger following the initialization. Or, an increase of the user-to-audio-object distance prior to merging of the user position and the CoM 810 may result in the CoM 810 moving towards the audio-object 420.

Reduced metadata rendering system 140 may define an interaction area for the audio-object 420 that depends on the local tracking of the user activity based on at least the user position (or analysis of the user position). Reduced metadata rendering system 140 may also use other aspects associated with the user or audio-object, such as speed of user movement, past user movement, etc. In some embodiments, reduced metadata rendering system 140 may provide instructions for the CoM 810 to follow the user 410 while still providing a preference (or secondary instructions) for the CoM 810 to stay close to (or return to) the audio-object 420.

Figure 9:
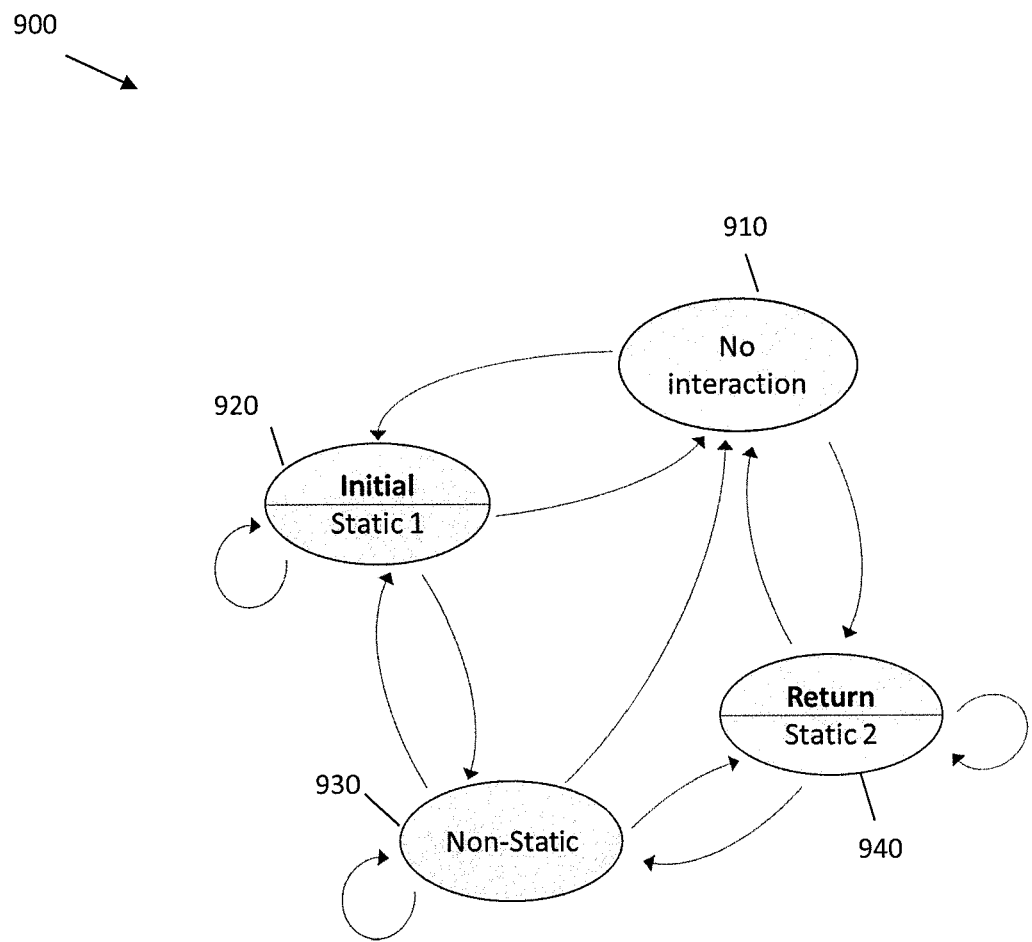
FIG. 9 is an example state machine illustration of audio-interaction events.

FIG. 9 is an example illustration 900 of audio-interaction events that may be detected based on the local tracking of the user movement and behavior in the proximity of an audio-object 420. Reduced metadata rendering system 140 may implement different states (for example, via a state machine, such as shown in FIG. 9) based on audio-interaction events derived by local tracking.

Reduced metadata rendering system 140 may control rendering for audio interactions without transmitted metadata. Reduced metadata rendering system 140 may analyze the particular audio interactions. When no metadata is available, reduced metadata rendering system 140 may derive possible interaction effect by other means. Reduced metadata rendering system 140 may use analysis of local tracking of the user 410, such as may already be performed for defining the interaction area 810. As described hereinabove, reduced metadata rendering system 140 may define the interaction area based on the user position (distance). On the other hand, reduced metadata rendering system 140 may determine the audio-object interaction effect to be applied to the rendering based on other information derived from the local tracking of the user activity. As described above, the user 410 may, for example, consume/interact with an audio-object 420 firstly on one side of the audio-object 420 and then proceed to leave this part of the scene, for example, through the audio-object 420. Reduced metadata rendering system 140 may determine that there are at least two parts in this activity. The first part may be mostly a static consumption part, while the other part may be a faster movement (which, in this instance, may furthermore be through the audio-object 420). Reduced metadata rendering system 140 may base the metadata-free interaction effect decisions on these types of user action transitions.

Referring again to FIG. 9, at 910, a first state in which the user 410 is not interacting with an audio-object 420, is shown. The user 410 may then enter a first interaction state with the audio-object at 920. This is denoted as an initial state, which may assume a first static user behavior and trigger a first interaction response for the rendering of the audio-object 420. For example, the audio-object 420 may grow in size and be stabilized in rendering position relative to the user 410. The size may be, for example, relative to the user-to-audio-object distance. From this first static state we may then trigger new responses every time a state is changed.

Reduced metadata rendering system 140 may have, for example, at least a non-static state 930 and/or a second static state differing from the first static state 920, where the user 410 has left the audio-object interaction area and has returned to interact with the same audio-object ('return') 940. For example, time instances 520 9-12 in FIG. 6 may correspond to an ending of, and subsequent relaunching of,
an audio-object interaction. The at least second interaction with the same audio-object may trigger a different response rendering.

In some embodiments, a user returning to interact with an audio object after a particular time has elapsed (for example, a minimum time has passed) may trigger the initial state 920 instead of the 'return' state 940. The reduced metadata rendering system 140 may therefore utilize at least one rule, which may be based on time, for selecting between the at least two static states that may be entered from the 'no interaction' state 910. In further embodiments, the rule may be carried over from a first user session to a second user session. It is understood that in some embodiments, only a single static state may be defined. Different audio objects may, depending on the implementation, have different number of states.

The static state 920 may occur in instances in which there is user movement (in addition to instances in which there is no user movement). For example, the static state may include instances in which there is a relatively local (on one side, in a certain segment, etc.) movement, and/or a relatively slow movement. Reduced metadata rendering system 140 may thereby trigger a transition from a static state when at least a user movement distance is over a threshold and/or a user movement speed is over a threshold. Reduced metadata rendering system 140 may determine that the interaction is entering a non-static state based on a particular amount of said movement over a time period (a time threshold). Transition from a non-static state to a static state may require a more stable user activity than firstly remaining in a static state. The reduced metadata rendering system 140 may implement the transition based on instructions provided by an implementer (for example, based on a particular virtual environment, etc.) and, at least in some cases, also based on the type of content.

The interaction states may each correspond to an interaction event (which may be a user activity model and a corresponding audio-object interaction response). These may be defined by the implementer or the content creator for the said implementation or content, respectively. Or they may be derived, for example, from an interaction event database.

Figure 10:
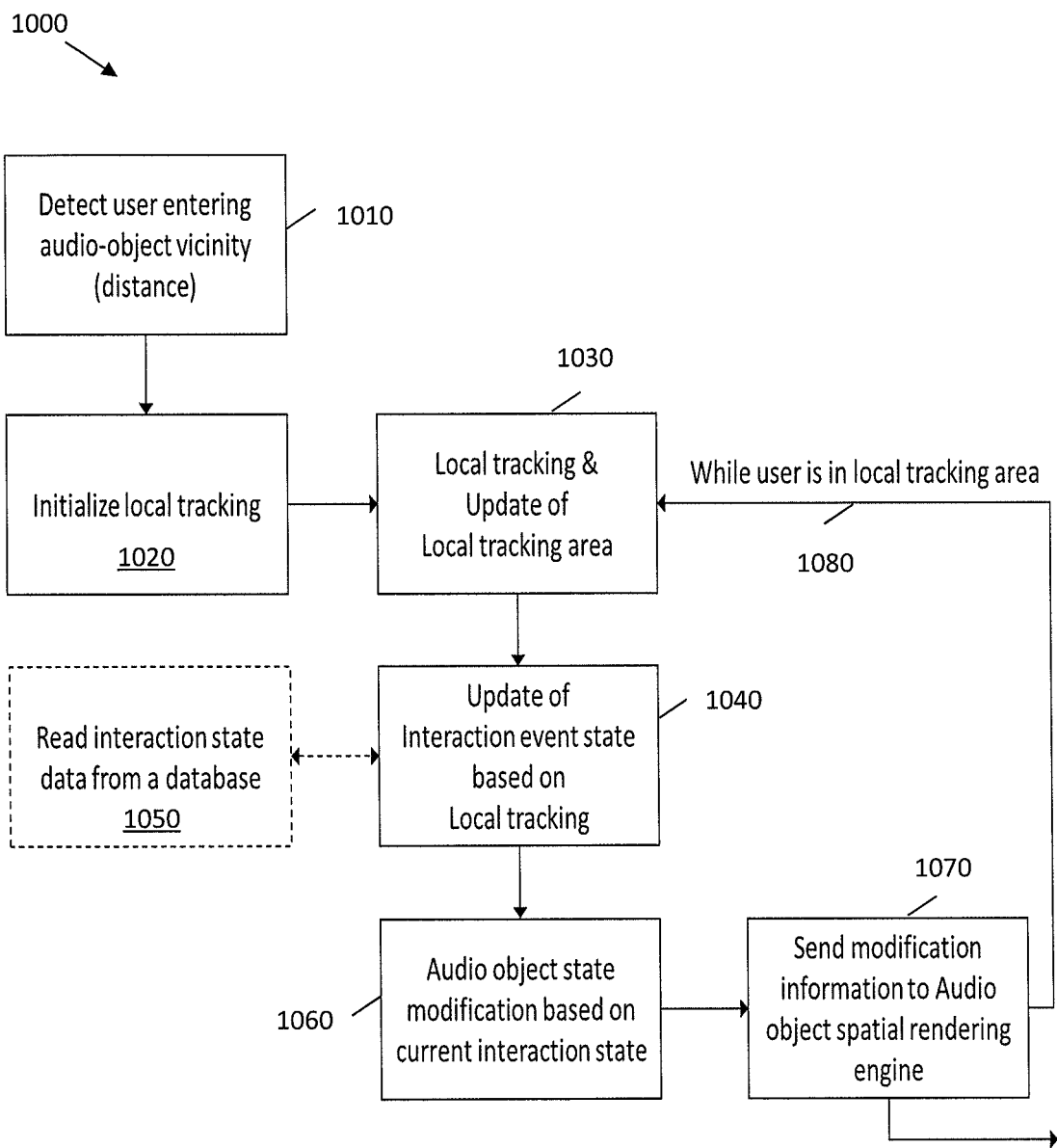
FIG. 10 is an example diagram illustrating components of a rendering system.

FIG. 10 is a diagram 1000 illustrating components of (corresponding to steps in a process implementing) a reduced metadata rendering system 140.

Reduced metadata rendering system 140 may, based on the local tracking and within the defined tracking area, determine when a user movement triggers a state transition (FIG. 9) and start applying the audio-object interaction for the new state. In some example embodiments, reduced metadata rendering system 140 may use a separate database for defining audio-object interaction events. Reduced metadata rendering system 140 may derive at least the user activity model for each state and/or the audio-object interaction response for the each state from a database.

At block 1010, reduced metadata rendering system 140 may detect that a user is entering an audio-object vicinity (or distance). Reduced metadata rendering system 140 may initialize local tracking at block 1020 and perform local tracking and update of local tracking area at block 1030. Reduced metadata rendering system 140 may update interaction event states based on local tracking at block 1040. Alternatively, or additionally, reduced metadata rendering system 140 may read interaction state data from a database at block 1050. At block 1060, reduced metadata rendering system 140 may perform audio-object state modification based on a current interaction state. At block 1070, reduced metadata rendering system 140 may send modification information to an audio object spatial rendering engine. Additionally, at block 1080, reduced metadata rendering system 140 may, while user is in local tracking area, perform local tracking and update of local tracking area.

In alternative implementations, reduced metadata rendering system 140 may utilize, for example, deep learning processes to further distinguish between various user activities or ways of reacting to audio-objects. Reduced metadata rendering system 140 may thereby allow for personalization of the system response. For example, reduced metadata rendering system 140 may utilize a training sequence of metadata-based audio-object interactions, where user movement is tracked, or reduced metadata rendering system 140 may learn how user responds to default interaction responses.

In further example embodiments, reduced metadata rendering system 140 may analyze the audio-object 420 and the analysis result may affect at least some of the audio-object interaction parameters, such as states and thresholds. In further example embodiments, reduced metadata rendering system 140 may also analyze the physical rendering environment (user's room properties). Reduced metadata rendering system 140 may similarly affect the audio-object interaction rendering when no pre-defined metadata is used.

Figure 11:
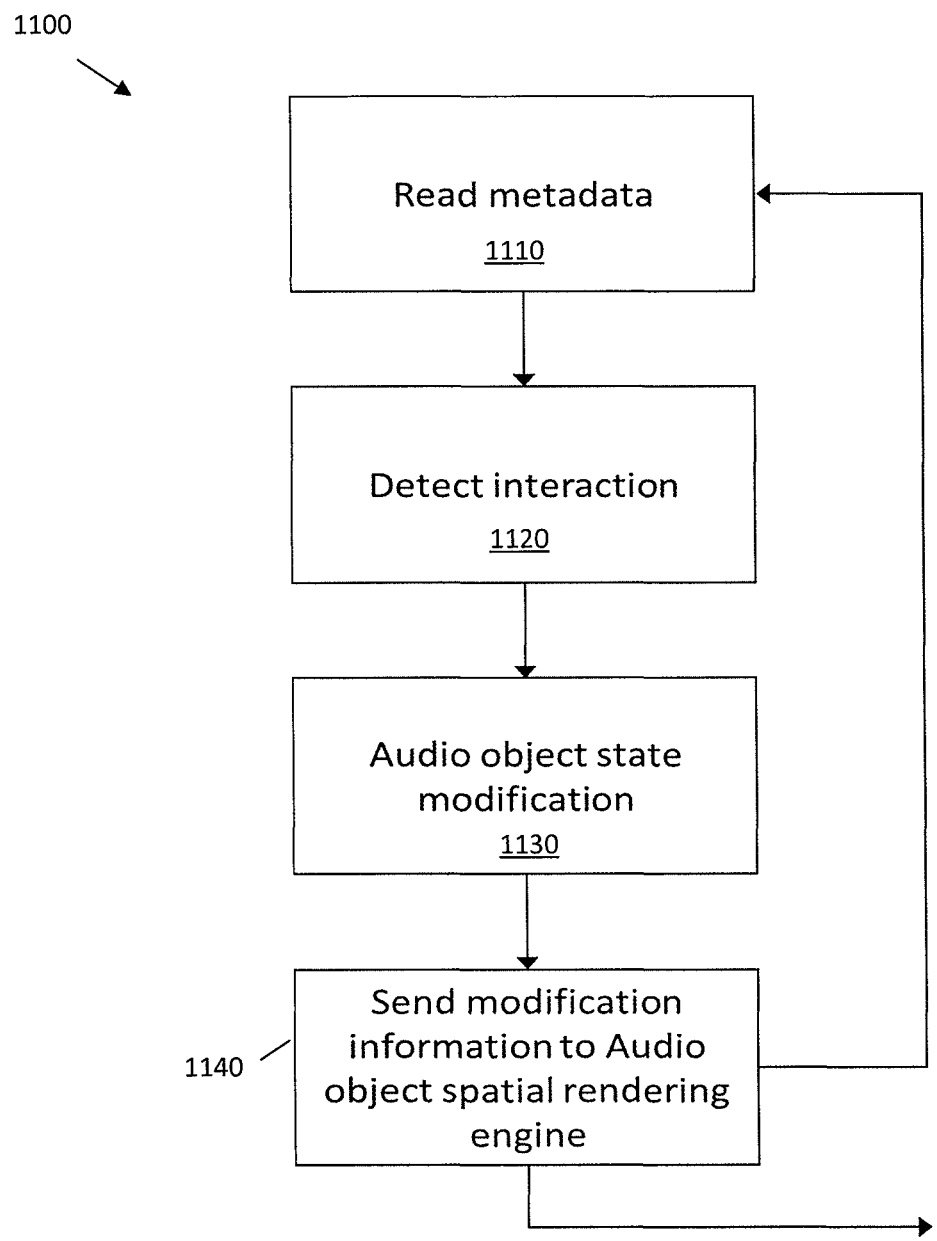
FIG. 11 is an example illustration of a High-level block diagram for metadata-based audio-object interactions.

Referring now to FIG. 11, a high-level block diagram illustrating rendering for metadata-based audio-object interactions is shown.

Reduced metadata rendering system 140 may implement processes to provide backwards compatibility with previous systems, when compared to metadata-based systems, such as described in U.S. patent application Ser. No. 15/293,607, which include metadata-based audio-object interactions. The metadata-based system may read the metadata (block 1110), detect interaction (block 1120), and determine information for an audio-object state modification (block 1130). The metadata-based system may then send the modification information to an audio-object spatial rendering engine (block 1140).

While reduced metadata rendering system 140 may allow controlled audio interactions without additional metadata (as shown in FIG. 9), reduced metadata rendering system 140 may also implement the metadata-free processes in conjunction with systems, such as the metadata-based system described with respect to FIG. 11, which implement metadata-based audio interactions. For example, in instances of network congestion, if a user is receiving a low-rate representation of a free-viewpoint audio scene, for example, over a wireless data link or communications system, complicated metadata may require a substantial amount of the overall bandwidth that would be better utilized for source-coding of the audio waveform. Therefore, reduced metadata rendering system 140 may utilize the metadata-free processes for rendering audio-object interactions and allow for the transmitter or a network element to drop the metadata and only transmit the audio payload in the downlink.

Figure 12:
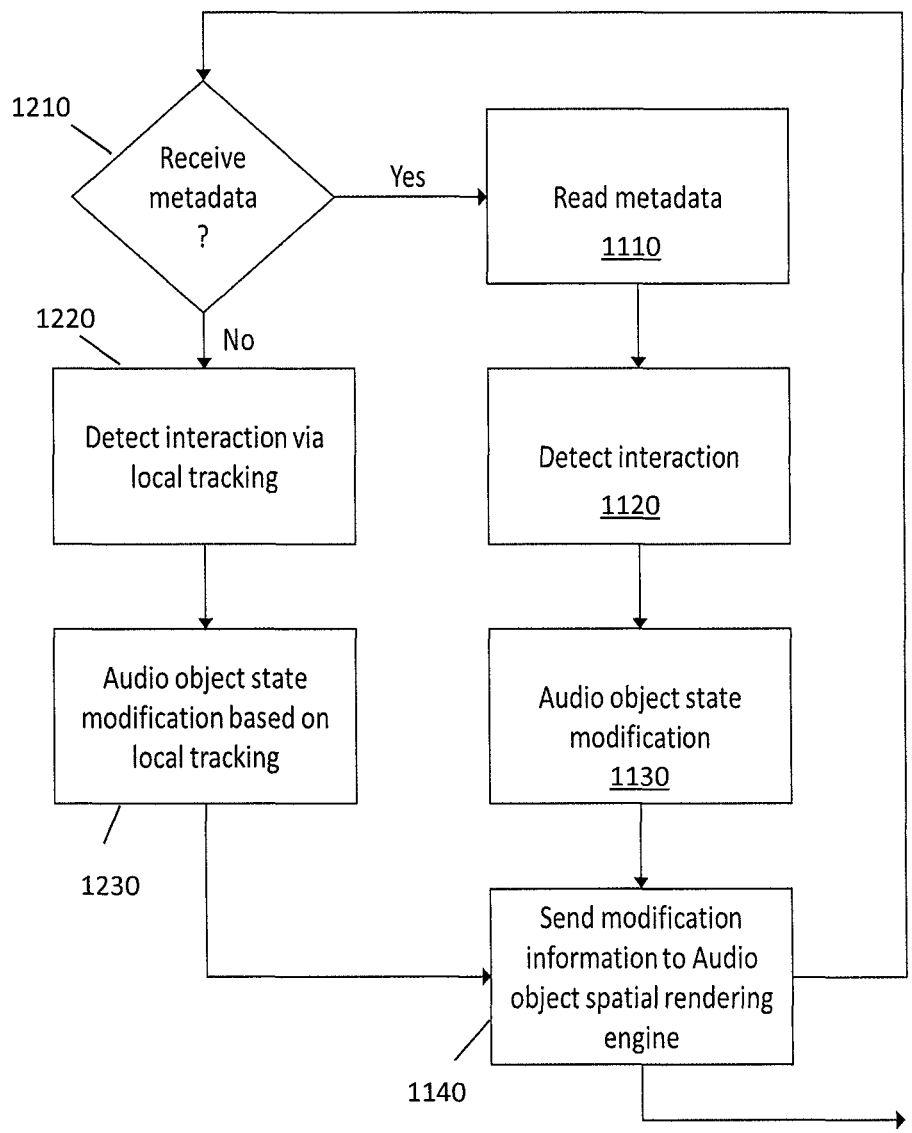
FIG. 12 is an example illustration of a high-level block diagram of a switched system implementing a reduced metadata rendering system as a backup system for a rendering system.

Referring to FIG. 12, a high-level block diagram of a switched system implementing metadata-free processes for rendering audio-object interactions as a backup system for a system that uses metadata for rendering audio-object interactions (for example, a system such as described in U.S. patent application Ser. No. 15/293,607) is shown.

As shown in FIG. 12, reduced metadata rendering system 140 may mirror (or perform as a substitute or alternate to) a metadata-based system, such as the system described with respect to FIG. 11, for instances in which metadata is not available. The functional blocks of FIG. 10 are thus re-arranged on the left-hand side of FIG. 12 to illustrate the high-level implementation of the two processes. The combined system may determine if metadata has been received at block 1210. If metadata has not been received, reduced metadata rendering system 140 may detect interaction via local tracking at block 1220 and determine an audio-object state modification based on local tracking at block 1230. Reduced metadata rendering system 140 may then send modification information to audio-object spatial rendering engine at block 1140. However, if metadata has been received, metadata-based system may perform steps 1110 to 1140, as described herein above with respect to FIG. 11.

Reduced metadata rendering system 140 may implement processes, for example, under heavy network congestion when metadata transmission may need to be dropped to save bandwidth or to allocate it in a way that is perceptually more beneficial. Thus, an administrator (or a combined system, such as described with respect to FIG. 12) may run the metadata-based system when metadata is received and switch to the reduced metadata rendering system 140 when no metadata is available. However, in these instances the combined system may be required to interpolate the effects in order not to create discontinuities if the switching between the two modes (branches) is frequent. For example, reduced metadata rendering system 140 may determine a metadata-free rendering utilizing the information about the past states derived from the received metadata in previous frames. The combined system may have a default setting so that as long as data rate is sufficient, the combined (or switched) system processes the rendering for the audio-object interactions via the metadata-based system (and only uses the reduced metadata rendering system 140 when no metadata is available).

Note that although the preceding implementations are described with respect to user movement, dynamic audio-objects may also move themselves, which may also affect the distance between the user position and the audio-object. In instance of determination of user-to-audio-object distance, the relative distance is measured, and reduced metadata rendering system 140 may discount whether the movement is due to the user moving or the audio-object moving. However, in instances of using local tracking of the user activity for determining the audio-interaction effects, the actual user movement is of interest. If the audio-object is also moving, reduced metadata rendering system 140 may compensate for the tracking in at least some embodiments.

The metadata-free rendering of audio-object interactions may provide technical advantages and/or enhance the end-user experience. At a high level, the processes may enable a stable audio-object rendering under audio-object interaction with no or reduced set of metadata available at the renderer. These processes are thereby suitable for example for very low bit rate VR systems where metadata transmission may not be favored and free-viewpoint rendering of legacy content that is not supported by the full-metadata system.

Reduced metadata rendering system 140 may thereby make it possible for the user to experience free-viewpoint audio based on both legacy content and new VR-specific content (for example, content that includes metadata for audio-object interactions). The interaction-area tracking may enable stabilizing the audio-object rendering. The tracking of user's local activity may further enable making further decisions on when to apply specific interaction rendering effects to the audio. Together these steps may significantly enhance the user experience. While reduced metadata rendering system 140 may not follow content creator or implementer instructions when no metadata is available, reduced metadata rendering system 140 may, in some instances, provide options (or make decisions) that correspond for example to typical content creator decisions at the renderer. Reduced metadata rendering system 140 may also implement personalization of audio-object interactions based on the modeling of a specific user's typical interaction style while experiencing free-viewpoint audio.

One advantage of the metadata-free rendering of audio-object interactions described herein is that it can be implemented as a stand-alone system (thus, it offers a new, alternative implementation for free-viewpoint audio-object interaction rendering) and in addition as a backup system for metadata-based systems (thus, improving the existing system for lower bit rates and legacy content). It can thus be used independently from metadata-based systems (in terms of not needing metadata) or in conjunction with metadata-based systems (when metadata is offered but it is not available due to transmission issues).

In accordance with an example, a method may include detecting interaction between the user and an audio-object via local tracking, determining an audio-object state modification based on the local tracking, and sending the audio-object state modification to an audio-object spatial rendering engine. The method may also include performing an audio-object interaction based on the audio-object state modification.

In accordance with another example, an example apparatus may comprise at least one processor; and at least one non-transitory memory including computer program code, the at least one memory and the computer program code configured to, with the at least one processor, cause the apparatus to: determine whether metadata associated with a user for audio-object interactions has been received, detect interaction between the user and an audio-object via local tracking in response to determination that metadata associated with the user for audio-object interactions has not been received, determine an audio-object state modification based on the local tracking, and send the audio-object state modification to an audio-object spatial rendering engine.

In accordance with another example, an example apparatus may comprise a non-transitory program storage device readable by a machine, tangibly embodying a program of instructions executable by the machine for performing operations, the operations comprising: detecting interaction between the user and an audio-object via local tracking, determining an audio-object state modification based on the local tracking, and sending the audio-object state modification to an audio-object spatial rendering engine.

In accordance with another example, an example apparatus comprises: means for determining whether metadata associated with a user for audio-object interactions has been received, means for detecting interaction between the user and an audio-object via local tracking in response to determination that metadata associated with the user for audio-object interactions has not been received, means for determining an audio-object state modification based on the local tracking, and means for sending the audio-object state modification to an audio-object spatial rendering engine.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   detecting interaction between a user and an audio-object at an interaction area via local tracking, wherein the local tracking includes determining local activity of the user based on a distance between the user and the audio-object at a plurality of time instances, wherein the determined local activity comprises activity within the interaction area over two or more of the plurality of time instances;
   determining an audio-object state modification based on the determined local activity and a first interaction state;
   transitioning between the first interaction state and a second interaction state based on the determined audio-object state modification; and
   performing an audio-object interaction response based on the transitioning.

2. The method of claim 1, wherein detecting the interaction between the user and the audio-object via the local tracking further comprises:
   detecting the user entering a vicinity of the audio-object;
   initializing the local tracking; and
   performing the local tracking and updating a local tracking area.

3. The method of claim 2, wherein determining the audio-object state modification based on the determined local activity and the first interaction state further comprises:
   accessing the second interaction state based on information from a database.

4. The method of claim 2, wherein determining the audio-object state modification based on the determined local activity and the first interaction state further comprises:
   determining the interaction area based on the distance between the user and the audio-object.

5. The method of claim 4, wherein determining the audio-object state modification based on the determined local activity and the first interaction state further comprises:
   tracking a user movement of the user relative to the audio-object within the interaction area; and
   determining the audio-object state modification based on the tracking of the user movement.

6. The method of claim 5, further comprising:
   triggering a predetermined response based on the tracking of the user movement.

7. The method of claim 2, wherein initializing the local tracking further comprises:

initializing the local tracking based on at least one local tracking distance.

8. The method of claim 7, wherein the at least one local tracking distance further comprises a distance derived based on past user behavior consuming free-viewpoint audio.

9. The method of claim 7, wherein the at least one local tracking distance further comprises a distance received via a device associated with a content creator.

10. The method of claim 2, wherein performing the local tracking and updating the local tracking area further comprises:
stabilizing an audio-object rendering at a variable distance to the audio-object based on user activity of the user.

11. The method of claim 1, further comprising:
determining a local tracking area; and
determining the interaction area, wherein the interaction area is different from the local tracking area.

12. The method of claim 1, further comprising:
determining the interaction area based on a center of mass associated with the user and the audio-object.

13. The method of claim 1, further comprising determining whether metadata associated with the user for audio-object interaction has been received, wherein the determining further comprises:
determining a level of network congestion associated with the audio-object interaction.

14. The method of claim 1, further comprising:
prior to the detecting of the interaction between the user and the audio-object via the local tracking, determining whether metadata associated with the user for audio-object interaction has been received;
wherein the interaction between the user and the audio-object is detected via the local tracking in response to a determination that the metadata associated with the user for audio-object interaction has not been received.

15. An apparatus comprising:
at least one processor; and
at least one non-transitory memory including computer program code, the at least one non-transitory memory and the computer program code configured to, with the at least one processor, cause the apparatus to:
detect interaction between a user and an audio-object at an interaction area via local tracking, wherein the local tracking includes determining local activity of the user based on a distance between the user and the audio-object at a plurality of time instances, wherein the determined local activity comprises activity within the interaction area over two or more of the plurality of time instances;
determine an audio-object state modification based on the determined local activity and a first interaction state;
transition between the first interaction state and a second interaction state based on the determined audio-object state modification; and
perform an audio-object interaction response based on the transition.

16. An apparatus as in claim 15, where, when detecting the interaction between the user and the audio-object via the local tracking, the at least one non-transitory memory and the computer program code are configured to, with the at least one processor, cause the apparatus to:
detect the user entering a vicinity of the audio-object;
initialize the local tracking; and
perform the local tracking and update a local tracking area.

17. An apparatus as in claim 16, where, when determining the audio-object state modification based on the determined local activity and the first interaction state, the at least one non-transitory memory and the computer program code are configured to, with the at least one processor, cause the apparatus to:
access the second interaction state based on information from a database.

18. An apparatus as in claim 17, where, when determining the audio-object state modification based on the determined local activity and the first interaction state, the at least one non-transitory memory and the computer program code are configured to, with the at least one processor, cause the apparatus to:
track a user movement of the user relative to the audio-object within the interaction area; and
determine the audio-object state modification based on tracking of the user movement, wherein the audio-object state modification is determined where the tracking of the user movement indicates at least one of:
an amount of the user movement over the two or more time instances reaches a threshold amount, or
a speed of the user movement over the two or more time instances reaches a threshold speed.

19. An apparatus as in claim 16, wherein, when initializing the local tracking, the at least one non-transitory memory and the computer program code are configured to, with the at least one processor, cause the apparatus to:
initialize the local tracking based on at least one local tracking distance.

20. A non-transitory program storage device readable with a machine, tangibly embodying a program of instructions executable with the machine for performing operations, the operations comprising:
detecting interaction between a user and an audio-object at an interaction area via local tracking, wherein the local tracking includes determining local activity of the user based on a distance between the user and the audio-object at a plurality of time instances, wherein the determined local activity comprises activity within the interaction area;
determining an audio-object state modification based on the determined local activity and a first interaction state;
transitioning between the first interaction state and a second interaction state based on the determined audio-object state modification; and
performing an audio-object interaction response based on the transitioning.

* * * * *